(12) United States Patent
Squire (10) Patent No.: US 12,447,363 B2
(45) Date of Patent: Oct. 21, 2025

(54) ENERGY ABSORBER

(71) Applicant: Latchways plc, Devizes (GB)

(72) Inventor: Jacob Thackeray Squire, Devizes (GB)

(73) Assignee: Latchways plc, Yate (GB)

( * ) Notice: Subject to any disclaimer, the term of this patent is extended or adjusted under 35 U.S.C. 154(b) by 516 days.

(21) Appl. No.: 17/910,048

(22) PCT Filed: Feb. 4, 2021

(86) PCT No.: PCT/GB2021/050248
§ 371 (c)(1),
(2) Date: Sep. 8, 2022

(87) PCT Pub. No.: WO2021/181058
PCT Pub. Date: Sep. 16, 2021

(65) Prior Publication Data
US 2023/0109537 A1     Apr. 6, 2023

(30) Foreign Application Priority Data

Mar. 12, 2020  (GB) ...................... 2003584

(51) Int. Cl.
*A62B 35/04*      (2006.01)
(52) U.S. Cl.
CPC .................... *A62B 35/04* (2013.01)
(58) Field of Classification Search
CPC . A62B 35/04; A62B 35/0056; A62B 35/0087; F16F 7/003; F16F 7/14;
(Continued)

(56) References Cited

U.S. PATENT DOCUMENTS 3,106,989 A * 10/1963 Fuchs .................. B60R 22/28
297/472
5,738,377 A * 4/1998 Sugiki .................. B62D 1/195
188/376
(Continued)

FOREIGN PATENT DOCUMENTS

| | | |
|---|---|---|
| EP | 1094240 A2 | 4/2001 |
| JP | S54149027 U | 10/1979 |
| WO | 2021/001711 A1 | 1/2021 |

OTHER PUBLICATIONS

International Search Report and Written Opinion of PCT Application PCT/GB2021/050248, dated Jun. 23, 2021.
(Continued)

*Primary Examiner* — Robert A. Siconolfi
*Assistant Examiner* — San M Aung
(74) *Attorney, Agent, or Firm* — Jones Day (57) ABSTRACT

An energy absorber (10) for use in a fall arrest system includes an elongate member (11) having a proximal end (14), a distal end (12), and a line of weakness (15, 16) extending in a longitudinal direction (A) along at least a portion of the elongate member between the proximal end (14) and the distal end (12). The line of weakness (15, 16) is at least partially non-linear. In response to application of a predetermined force, the elongate member (11) is configured to tear along the line of weakness (15, 16), thereby at least partially absorbing energy of a user's fall.

20 Claims, 3 Drawing Sheets

(58) Field of Classification Search
CPC .... F16F 7/123; F16F 7/128; F16F 2224/0208; F16F 2224/0233; F16F 2234/06; F16F 2236/06; E01F 13/02; E01F 13/022; E01F 13/028; E01F 13/12; E01F 15/06; E04H 17/04; E04H 17/08; E04G 21/3233; E04G 21/3261; E04G 21/3242; E04G 21/3276; E04G 21/3295; E04G 21/329; E04G 5/045
USPC ......................................................... 188/376
See application file for complete search history.

(56) References Cited

U.S. PATENT DOCUMENTS

| | | | | |
|---|---|---|---|---|
| 6,279,680 | B1* | 8/2001 | Casebolt | ............... E04G 21/329 188/371 |
| 9,272,168 | B2 | 3/2016 | Parker | |
| 2009/0133977 | A1 | 5/2009 | Warren | |
| 2009/0194366 | A1* | 8/2009 | Parker | ................. E04G 21/3261 188/371 |
| 2009/0277719 | A1* | 11/2009 | Clough | ............... E04G 21/3261 182/5 |
| 2011/0094839 | A1 | 4/2011 | Blomberg et al. | |
| 2014/0124292 | A1* | 5/2014 | Montgomery | ......... A62B 35/04 188/371 |
| 2015/0299966 | A1 | 10/2015 | Fulde et al. | |
| 2016/0243384 | A1* | 8/2016 | Wells | ..................... A62B 35/04 |
| 2019/0314656 | A1 | 10/2019 | Farrell et al. | |

OTHER PUBLICATIONS

UK Intellectual Property Office; Appl. GB2003584.6; Examination Report; Dec. 12, 2023.

* cited by examiner

ENERGY ABSORBER

CROSS-REFERENCE TO RELATED APPLICATION

This application is a U.S. National Stage Application under 35 U.S.C. § 371 of International Patent Application No. PCT/GB2021/050248, filed Feb. 4, 2021, which claims priority to United Kingdom Patent Application No. 2003584.6, filed Mach 12, 2020, the disclosures of which are incorporated by reference herein in their entireties.

BACKGROUND

Technical Field

The present disclosure relates to energy absorbers for use in fall protection equipment. In particular, the present disclosure relates to improved strip energy absorbers and fall arrest systems comprising such an energy absorber.

Technical Considerations

Fall arrest systems are used to prevent personnel working at heights from suffering injury as a result of falling or other such events. Fall arrest systems are often referred to as height safety systems or fall protection systems. Frequently such systems utilize an energy absorber device operable to be activated if a load above a predetermined threshold is applied. The energy absorber devices can take many forms, such as fabric rip devices, friction brake devices, or plastically deformable arrangements that are plastically deformed during deployment in order to absorb energy.

A known type of energy absorber comprises a metallic strip or strap which at least partially tears or rips in order to absorb the energy of a user's fall. The metallic strips generally comprise a scored line or line of perforations which act as a guide path along which the strip tears. In order to absorb a sufficient amount of energy in a fall arrest event the energy absorbers typically have to be quite long, which can make the equipment bulky and inconvenient. Examples of these energy absorbers are described in U.S. Pat. Nos. 6,279,680 and 9,272,168.

There is a need for an energy absorber which improves the amount of energy absorbed without increasing the size of the absorber. There is also a need for a more reliable energy absorber with improved efficacy and safety.

SUMMARY

Accordingly, provided are improved energy absorbers, such as strip energy absorbers, and fall arrest systems comprising such an energy absorber.

In some non-limiting embodiments or aspects, the present disclosure provides an energy absorber for use in a fall arrest system, the energy absorber including: an elongate member having a proximal end and a distal end; and a line of weakness extending in a longitudinal direction along at least a portion of the elongate member between the proximal end and the distal end, wherein the line of weakness is at least partially non-linear, wherein, in response to the application of a predetermined force, the elongate member is configured to tear along the line of weakness.

In response to the application of the predetermined force, the predetermined force being indicative of a fall arrest event, the elongate member is configured to tear along the line of weakness, thereby at least partially absorbing the energy of a user's fall.

In some non-limiting embodiments or aspects, the line of weakness may extend between the proximal end and the distal end of the elongate member and is at least partially non-linear. Thus, the line of weakness may not be a straight line, or in other words, the line of weakness may be arranged to follow a non-linear path. This may be advantageous as it increases the length of the line of weakness without increasing the size of the elongate member, thereby increasing the energy absorption capacity. Increasing the tearable length of the energy absorber also results in improved control of force in a fall arrest event.

Thus, in the present disclosure, a thinner elongate member can be used compared to the prior art. A thinner material tears at a lower force. However, by providing more tearable length for the same given length of energy absorber, the present disclosure can still absorb the same amount of energy in a fall arrest event as a thicker energy absorber having a linear line of weakness (e.g. straight groove). Having a thinner elongate member is more cost effective and convenient for the user, as the energy absorber is lighter and less bulky.

It will be appreciated that, although the line of weakness may include linear portions, or at least one straight line, overall the path followed by the line of weakness is non-linear.

Optionally, in some non-limiting embodiments or aspects, the line of weakness may include a line of perforations.

Optionally, in some non-limiting embodiments or aspects, the line of weakness is, or may include, a groove. The groove may be continuous.

Optionally, in some non-limiting embodiments or aspects, the line of weakness (or groove) may be at least partially wavy and/or zig-zagged and/or serriform. Optionally, the line of weakness may at least partially follow the path of a sinusoidal wave, or a triangular wave.

The line of weakness may be etched or scored on (or into) the elongate member.

Optionally, in some non-limiting embodiments or aspects, the line of weakness may be formed by laser etching the elongate member. It may be preferred to use laser etching (as opposed to scoring) as this improves the accuracy of the manufacturing process. Also, laser etching does not add any additional stress to the energy absorber and there is no tooling wear from a scoring wheel. Manufacturing stress and tooling wear can significantly alter the predetermined force (or deployment force) at which the elongate member will tear, affecting the safety and efficacy of the energy absorber.

In some non-limiting embodiments or aspects, in response to application of the predetermined force, the elongate member may be configured to tear along the line of weakness from the proximal end towards the distal end. The line of weakness may include a starting point at the proximal end of the elongate member and an end point at the distal end of the elongate member.

In some non-limiting embodiments or aspects, the line of weakness does not extend the full length of the elongate member. There may be a gap between the proximal edge and/or the distal edge of the elongate member and the line of weakness. Thus, during deployment, the elongate member may tear along the line of weakness, thereby at least partially peeling or separating a first portion of the elongate member from a second portion of the elongate member, wherein the first and second portions remain attached (or joined together). The first portion may be referred to as a tear strip.

Optionally, in some non-limiting embodiments or aspects, the line of weakness may include a linear portion (or straight line) disposed at the proximal end of the elongate member. The elongate member may be configured to initially tear along the linear portion of the line of weakness. It may be advantageous to start the tear along a straight line, as this lowers the initial force required to start the tear compared to the non-linear portion of the line of weakness.

In some non-limiting embodiments or aspects, the energy absorber may include a plurality of lines of weakness.

Optionally, in some non-limiting embodiments or aspects, the energy absorber may include a first line of weakness and a second line of weakness. Each line of weakness may be a groove, preferably a laser etched groove.

The first line of weakness may be substantially the same length as the second line of weakness.

The first line of weakness may be transversely spaced from the second line of weakness.

Optionally, in some non-limiting embodiments or aspects, the first line of weakness may be offset or misaligned from the second line of weakness.

Optionally, in some non-limiting embodiments or aspects, the first line of weakness and the second line of weakness each may have a plurality of turning points, wherein the turning points of the first line of weakness are offset or misaligned from the turning points of the second line of weakness.

Optionally, in some non-limiting embodiments or aspects, the first line of weakness and the second line of weakness each may have a plurality of peaks and troughs, wherein the peaks of the first line of weakness are offset or misaligned from the troughs and/or the peaks of the second line of weakness.

Optionally, in some non-limiting embodiments or aspects, the turning points, or the peaks and troughs, of the first and/or second lines of weakness may be rounded. In some non-limiting embodiments or aspects, the peaks and troughs, of the first and/or second lines of weakness may be angular, or triangular.

The first line of weakness may be out of phase with the second line of weakness.

Optionally, in some non-limiting embodiments or aspects, the first and/or second line of weakness may be deeper (or has an increased depth) at the plurality of turning points, or the plurality peaks and troughs, compared to the remainder of the respective line of weakness.

Optionally, in some non-limiting embodiments or aspects, the first line of weakness may have a phase difference of approximately 90 degrees relative to the second line of weakness.

In some non-limiting embodiments or aspects, the energy absorber may include a tab. The tab may be divided from the elongate member by a cut, wherein the, or each, line of weakness extends from the tab towards the distal end of the elongate member.

Optionally, in some non-limiting embodiments or aspects, the tab may include a first edge and a second edge and a first line of weakness extends from the first edge of the tab and a second line of weakness extends from the second edge of the tab.

Optionally, in some non-limiting embodiments or aspects, the first and second lines of weakness each may include a linear portion.

In some non-limiting embodiments or aspects, the linear portion of the first line of weakness may be connected to the first edge of the tab and the linear portion of the second line of weakness may be connected to the second edge of the tab. It may be advantageous to start the tear along a straight line, as this lowers the initial force required to start the tear compared to the non-linear portion of the line of weakness.

Optionally, in some non-limiting embodiments or aspects, each linear portion may be of the same depth as the rest (or remainder) of the line of weakness.

Optionally, in some non-limiting embodiments or aspects, the proximal end of the elongate member may include a first aperture and the tab comprises a second aperture. The first and second apertures may each be configured to receive a respective connector (e.g. a shackle or karabiner) therethrough.

Optionally, in some non-limiting embodiments or aspects, each line of weakness may be spaced from the distal end and/or the proximal end of the elongate member.

Optionally, in some non-limiting embodiments or aspects, the elongate member may be a metallic strip. Optionally, the metallic strip may include aluminum and/or steel.

Optionally, in some non-limiting embodiments or aspects, each line of weakness may have a depth of approximately 0.5 mm. It will be appreciated that the depth of each line of weakness may vary depending on the material of the elongate member and/or the desired properties of the energy absorber.

Optionally, in some non-limiting embodiments or aspects, the elongate member may be provided (when undeployed) in a coiled configuration and, in response to the application of the predetermined force, the elongate member may be configured to deploy to an uncoiled configuration.

Optionally, in some non-limiting embodiments or aspects, each line of weakness may be a continuous line of reduced thickness along the elongate member.

Optionally, in some non-limiting embodiments or aspects, the depth of each line of weakness may be substantially the same along the length of the line of weakness.

In some non-limiting embodiments or aspects, the present disclosure provides a fall arrest system having a fall arrest device and the energy absorber of any embodiment of the first aspect of the disclosure.

The fall arrest device may be a self-retracting lifeline device (SRL).

In some non-limiting embodiments or aspects, an energy absorber for use in a fall arrest system may include an elongate member comprising a proximal end and a distal end, and at least one line of weakness extending in a longitudinal direction in a non-linear manner along at least a portion of the elongate member between the proximal end and the distal end. In response to an application of a predetermined force, the elongate member may be configured to tear along the at least one line of weakness.

In some non-limiting embodiments or aspects, the at least one line of weakness may be a groove.

In some non-limiting embodiments or aspects, the at least one line of weakness may be at least one of the following: partially wavy, zig-zagged, serriform, and any combination thereof.

In some non-limiting embodiments or aspects, the at least one line of weakness may be formed by laser etching.

In some non-limiting embodiments or aspects, the at least one line of weakness may include a first line of weakness and a second line of weakness, wherein the first line of weakness is transversely spaced from the second line of weakness.

In some non-limiting embodiments or aspects, the first line of weakness may be offset or misaligned from the second line of weakness.

In some non-limiting embodiments or aspects, the first line of weakness and the second line of weakness each may have a plurality of turning points, wherein the plurality of turning points of the first line of weakness are offset or misaligned from the plurality of turning points of the second line of weakness.

In some non-limiting embodiments or aspects, the first line of weakness and the second line of weakness each may have a plurality of peaks and a plurality of troughs, wherein at least one of the plurality of peaks and the plurality of troughs of the first line of weakness are offset or misaligned from at least one of the plurality of peaks and the plurality of troughs of the second line of weakness.

In some non-limiting embodiments or aspects, at least one of the plurality of turning points, the plurality of peaks, and the plurality of troughs of the first line of weakness and the second line of weakness may be rounded.

In some non-limiting embodiments or aspects, one of the first line of weakness and the second line of weakness may be deeper at the plurality of turning points, the plurality peaks, or the plurality of troughs compared to the other of the first line of weakness and the second line of weakness.

In some non-limiting embodiments or aspects, a tab may be divided from the elongate member by a cut, wherein the at least one line of weakness may extend from the tab towards the distal end of the elongate member.

In some non-limiting embodiments or aspects, the tab may include a first edge and a second edge, and the at least one line of weakness may include a first line of weakness extending from the first edge of the tab and a second line of weakness extending from the second edge of the tab.

In some non-limiting embodiments or aspects, the first line of weakness and the second line of weakness each may include a linear portion, wherein the linear portion of the first line of weakness and the second line of weakness is connected to the first edge of the tab and the second edge of the tab, respectively.

In some non-limiting embodiments or aspects, each linear portion may have a same depth as a depth of remaining portion of the first line of weakness and the second line of weakness.

In some non-limiting embodiments or aspects, the proximal end of the elongate member may include a first aperture configured for receiving a first connector connected to an anchor point, and the tab may include a second aperture configured for receiving a second connector connected to a user.

In some non-limiting embodiments or aspects, at least one line of weakness may be spaced from at least one of the distal end and the proximal end of the elongate member.

In some non-limiting embodiments or aspects, elongate member may be a metallic strip.

In some non-limiting embodiments or aspects, the elongate member may be provided in a coiled configuration and, in response to the application of the predetermined force, the elongate member may be configured to deploy to an uncoiled configuration.

In some non-limiting embodiments or aspects, the at least one line of weakness may be a continuous line of reduced thickness of the elongate member, or it may include a plurality of perforations.

In some non-limiting embodiments or aspects, a depth of the at least one line of weakness may be substantially the same along a length of the at least one line of weakness, or the depth of the at least one line of weakness may vary along the length of the at least one line of weakness.

Further non-limiting embodiments or aspects are set forth in the following numbered clauses:

Clause 1: An energy absorber for use in a fall arrest system, comprising: an elongate member comprising a proximal end and a distal end; and a line of weakness extending in a longitudinal direction along at least a portion of the elongate member between the proximal end and the distal end, wherein the line of weakness is at least partially non-linear, wherein, in response to the application of a predetermined force, the elongate member is configured to tear along the line of weakness.

Clause 2: The energy absorber according to clause 1, wherein the line of weakness is a groove.

Clause 3: The energy absorber according to clause 1 or 2, wherein the line of weakness is at least partially wavy and/or zig-zagged and/or serriform.

Clause 4: The energy absorber according to any of clauses 1-3, wherein the line of weakness is formed by laser etching.

Clause 5: The energy absorber according to any of clauses 1-4, further comprising a first line of weakness and a second line of weakness, wherein the first line of weakness is transversely spaced from the second line of weakness.

Clause 6: The energy absorber according to any of clauses 1-5, wherein the first line of weakness is offset or misaligned from the second line of weakness.

Clause 7: The energy absorber according to any of clauses 1-6, wherein the first line of weakness and the second line of weakness each have a plurality of turning points, wherein the turning points of the first line of weakness are offset or misaligned from the turning points of the second line of weakness.

Clause 8: The energy absorber according to any of clauses 1-7, wherein the first line of weakness and the second line of weakness each have a plurality of peaks and troughs, wherein the peaks of the first line of weakness are offset or misaligned from the troughs and/or the peaks of the second line of weakness.

Clause 9: The energy absorber according to any of clauses 1-8, wherein the turning points, or the peaks and troughs, of the first and second lines of weakness are rounded.

Clause 10: The energy absorber according to any of clauses 1-9, wherein the first and/or second line of weakness is deeper at the plurality of turning points, or the plurality peaks and troughs, compared to the remainder of the respective line of weakness.

Clause 11: The energy absorber according to any of clauses 1-10, wherein the first line of weakness has a phase difference of approximately 90 degrees relative to the second line of weakness.

Clause 12: The energy absorber according to any of clauses 1-11, further comprising a tab divided from the elongate member by a cut, wherein the, or each, line of weakness extends from the tab towards the distal end of the elongate member.

Clause 13: The energy absorber according to any of clauses 1-12, wherein the tab comprises a first edge and a second edge and a first line of weakness extends from the first edge of the tab and a second line of weakness extends from the second edge of the tab.

Clause 14: The energy absorber according to any of clauses 1-13, wherein the first and second lines of weakness each comprise a linear portion, wherein the linear portion of the first and second lines of weakness is connected to the first and second edges of the tab, respectively.

Clause 15: The energy absorber according to any of clauses 1-14, wherein each linear portion is of the same depth as the rest of the line of weakness.

Clause 16: The energy absorber according to any of clauses 1-15, wherein the proximal end of the elongate member comprises a first aperture and the tab comprises a second aperture.

Clause 17: The energy absorber according to any of clauses 1-16, wherein the, or each, line of weakness is spaced from the distal end and/or the proximal end of the elongate member.

Clause 18: The energy absorber according to any of clauses 1-17, wherein the elongate member is metallic strip.

Clause 19: The energy absorber according to any of clauses 1-18, wherein the elongate member is provided in a coiled configuration and, in response to the application of a predetermined force, the elongate member is configured to deploy to an uncoiled configuration.

Clause 20: The energy absorber according to any of clauses 1-19, wherein the, or each, line of weakness is a continuous line of reduced thickness.

Clause 21: The energy absorber according to any of clauses 1-20, wherein the depth of the, or each, line of weakness is substantially the same along the length of the line of weakness.

Clause 22: A fall arrest system comprising: a fall arrest device; and the energy absorber of any of clauses 1-21.

Clause 23: An energy absorber for use in a fall arrest system, the energy absorber comprising: an elongate member comprising a proximal end and a distal end; and at least one line of weakness extending in a longitudinal direction in a non-linear manner along at least a portion of the elongate member between the proximal end and the distal end, wherein, in response to an application of a predetermined force, the elongate member is configured to tear along the at least one line of weakness.

Clause 24: The energy absorber according to clause 23, wherein the at least one line of weakness is a groove.

Clause 25: The energy absorber according to clause 23 or 24, wherein the at least one line of weakness is at least one of the following: partially wavy, zig-zagged, serriform, and any combination thereof.

Clause 26: The energy absorber according to any of clauses 23-25, wherein the at least one line of weakness is formed by laser etching.

Clause 27: The energy absorber according to any of clauses 23-26, wherein the at least one line of weakness comprises a first line of weakness and a second line of weakness, wherein the first line of weakness is transversely spaced from the second line of weakness.

Clause 28: The energy absorber according to any of clauses 23-27, wherein the first line of weakness is offset or misaligned from the second line of weakness.

Clause 29: The energy absorber according to any of clauses 23-28, wherein the first line of weakness and the second line of weakness each have a plurality of turning points, wherein the plurality of turning points of the first line of weakness are offset or misaligned from the plurality of turning points of the second line of weakness.

Clause 30: The energy absorber according to any of clauses 23-29, wherein the first line of weakness and the second line of weakness each have a plurality of peaks and a plurality of troughs, wherein at least one of the plurality of peaks and the plurality of troughs of the first line of weakness are offset or misaligned from at least one of the plurality of peaks and the plurality of troughs of the second line of weakness.

Clause 31: The energy absorber according to any of clauses 23-30, wherein at least one of the plurality of turning points, the plurality of peaks, and the plurality of troughs of the first line of weakness and the second line of weakness are rounded.

Clause 32: The energy absorber according to any of clauses 23-31, wherein one of the first line of weakness and the second line of weakness is deeper at the plurality of turning points, the plurality peaks, or the plurality of troughs compared to the other of the first line of weakness and the second line of weakness.

Clause 33: The energy absorber according to any of clauses 23-32, further comprising a tab divided from the elongate member by a cut, wherein the at least one line of weakness extends from the tab towards the distal end of the elongate member.

Clause 34: The energy absorber according to any of clauses 23-33, wherein the tab comprises a first edge and a second edge, and wherein the at least one line of weakness comprises a first line of weakness extending from the first edge of the tab and a second line of weakness extending from the second edge of the tab.

Clause 35: The energy absorber according to any of clauses 23-34, wherein the first line of weakness and the second line of weakness each comprise a linear portion, wherein the linear portion of the first line of weakness and the second line of weakness is connected to the first edge of the tab and the second edge of the tab, respectively.

Clause 36: The energy absorber according to any of clauses 23-35, wherein each linear portion has a same depth as a depth of remaining portion of the first line of weakness and the second line of weakness.

Clause 37: The energy absorber according to any of clauses 23-36, wherein the proximal end of the elongate member comprises a first aperture configured for receiving a first connector connected to an anchor point, and wherein the tab comprises a second aperture configured for receiving a second connector connected to a user.

Clause 38: The energy absorber according to any of clauses 23-37, wherein at least one line of weakness is spaced from at least one of the distal end and the proximal end of the elongate member.

Clause 39: The energy absorber according to any of clauses 23-38, wherein the elongate member is a metallic strip.

Clause 40: The energy absorber according to any of clauses 23-39, wherein the elongate member is provided in a coiled configuration and, in response to the application of the predetermined force, the elongate member is configured to deploy to an uncoiled configuration.

Clause 41: The energy absorber according to any of clauses 23-40, wherein the at least one line of weakness is a continuous line of reduced thickness of the elongate member, or wherein the at least one line of weakness comprises a plurality of perforations.

Clause 42: The energy absorber according to any of clauses 23-41, wherein a depth of the at least one line of weakness is substantially the same along a length of the at least one line of weakness, or wherein the depth of the at least one line of weakness varies along the length of the at least one line of weakness.

Clause 43: An energy absorber for use in a fall arrest system, the energy absorber comprising: an elongate member comprising a proximal end and a distal end; and at least one line of weakness extending in a longitudinal direction in a non-linear manner along at least a portion of the elongate member between the proximal end and the distal end, wherein, in response to an application of a predetermined force, the elongate member is configured to tear along the at least one line of weakness.

Clause 44: The energy absorber according to clause 43, wherein the at least one line of weakness is a groove.

Clause 45: The energy absorber according to clause 43 or 44, wherein the at least one line of weakness is at least one of the following: partially wavy, zig-zagged, serriform, and any combination thereof.

Clause 46: The energy absorber according to any of clauses 43-45, wherein the at least one line of weakness is formed by laser etching.

Clause 47: The energy absorber according to any of clauses 43-46, wherein the at least one line of weakness comprises a first line of weakness and a second line of weakness, wherein the first line of weakness is transversely spaced from the second line of weakness.

Clause 48: The energy absorber according to any of clauses 43-47, wherein the first line of weakness is offset or misaligned from the second line of weakness.

Clause 49: The energy absorber according to any of clauses 43-48, wherein the first line of weakness and the second line of weakness each have a plurality of turning points, wherein the plurality of turning points of the first line of weakness are offset or misaligned from the plurality of turning points of the second line of weakness.

Clause 50: The energy absorber according to any of clauses 43-49, wherein the first line of weakness and the second line of weakness each have a plurality of peaks and a plurality of troughs, wherein at least one of the plurality of peaks and the plurality of troughs of the first line of weakness are offset or misaligned from at least one of the plurality of peaks and the plurality of troughs of the second line of weakness.

Clause 51: The energy absorber according to any of clauses 43-50, wherein at least one of the plurality of turning points, the plurality of peaks, and the plurality of troughs of the first line weakness and the second line of weakness are rounded.

Clause 52: The energy absorber according to any of clauses 43-51, wherein one of the first line of weakness and the second line of weakness is deeper at the plurality of turning points, the plurality peaks, or the plurality of troughs compared to the other of the first line of weakness and the second line of weakness.

Clause 53: The energy absorber according to any of clauses 43-52, further comprising a tab divided from the elongate member by a cut, wherein the at least one line of weakness extends from the tab towards the distal end of the elongate member.

Clause 54: The energy absorber according to any of clauses 43-53, wherein the tab comprises a first edge and a second edge, and wherein the at least one line of weakness comprises a first line of weakness extending from the first edge of the tab and a second line of weakness extending from the second edge of the tab.

Clause 55: The energy absorber according to any of clauses 43-54, wherein the first line of weakness and the second line of weakness each comprise a linear portion, wherein the linear portion of the first line of weakness and the second line of weakness is connected to the first edge of the tab and the second edge of the tab, respectively.

Clause 56: The energy absorber according to any of clauses 43-55, wherein each linear portion has a same depth as a depth of remaining portion of the first line of weakness and the second line of weakness.

Clause 57: The energy absorber according to any of clauses 43-56, wherein the proximal end of the elongate member comprises a first aperture configured for receiving a first connector connected to an anchor point, and wherein the tab comprises a second aperture configured for receiving a second connector connected to a user.

Clause 58: The energy absorber according to any of clauses 43-57, wherein at least one line of weakness is spaced from at least one of the distal end and the proximal end of the elongate member.

Clause 59: The energy absorber according to any of clauses 43-58, wherein the elongate member is a metallic strip.

Clause 60: The energy absorber according to any of clauses 43-59, wherein the elongate member is provided in a coiled configuration and, in response to the application of the predetermined force, the elongate member is configured to deploy to an uncoiled configuration.

Clause 61: The energy absorber according to any of clauses 43-60, wherein the at least one line of weakness is a continuous line of reduced thickness of the elongate member, or wherein the at least one line of weakness comprises a plurality of perforations.

Clause 62: The energy absorber according to any of clauses 43-61, wherein a depth of the at least one line of weakness is substantially the same along a length of the at least one line of weakness, or wherein the depth of the at least one line of weakness varies along the length of the at least one line of weakness.

BRIEF DESCRIPTION OF THE DRAWINGS

Illustrative embodiments of the disclosure will now be described, by way of example only, in relation to the accompanying drawings, in which.

It will be appreciated that FIGS. 1 to 5 are schematic drawings and features are not necessarily drawn to scale.

DETAILED DESCRIPTION

As used herein, the singular form of "a", "an", and "the" include plural referents unless the context clearly dictates otherwise.

Spatial or directional terms, such as "left", "right", "inner", "outer", "above", "below", and the like, relate to the embodiments or aspects as shown in the drawing figures and are not to be considered as limiting as the embodiments or aspects can assume various alternative orientations.

All numbers used in the specification and claims are to be understood as being modified in all instances by the term "about" or "approximately". By "about" or "approximately" is meant within plus or minus twenty-five percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

All documents referred to herein are "incorporated by reference" in their entirety.

The term "at least" is synonymous with "greater than or equal to".

As used herein, "at least one of" is synonymous with "one or more of". For example, the phrase "at least one of A, B, or C" means any one of A, B, or C, or any combination of any two or more of A, B, or C. For example, "at least one of A, B, and C" includes A alone; or B alone; or C alone; or A and B; or A and C; or B and C; or all of A, B, and C.

The word "comprising" and "comprises", and the like, does not exclude the presence of elements or steps other than those listed in any claim or the specification as a whole. In the present specification, "comprises" means "includes" and "comprising" means "including".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular", "transverse", "substantially perpendicular", or "substantially transverse" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The discussion of various embodiments or aspects may describe certain features as being "particularly" or "preferably" within certain limitations (e.g., "preferably", "more preferably", or "even more preferably", within certain limitations). It is to be understood that the disclosure is not limited to these particular or preferred limitations but encompasses the entire scope of the various embodiments and aspects described herein.

The disclosure comprises, consists of, or consists essentially of, the following embodiments or aspects, in any combination. Various embodiments or aspects of the disclosure are illustrated in separate drawing figures. However, it is to be understood that this is simply for ease of illustration and discussion. In the practice of the disclosure, one or more embodiments or aspects shown in one drawing figure can be combined with one or more embodiments or aspects shown in one or more of the other drawing figures.

Figure 1:
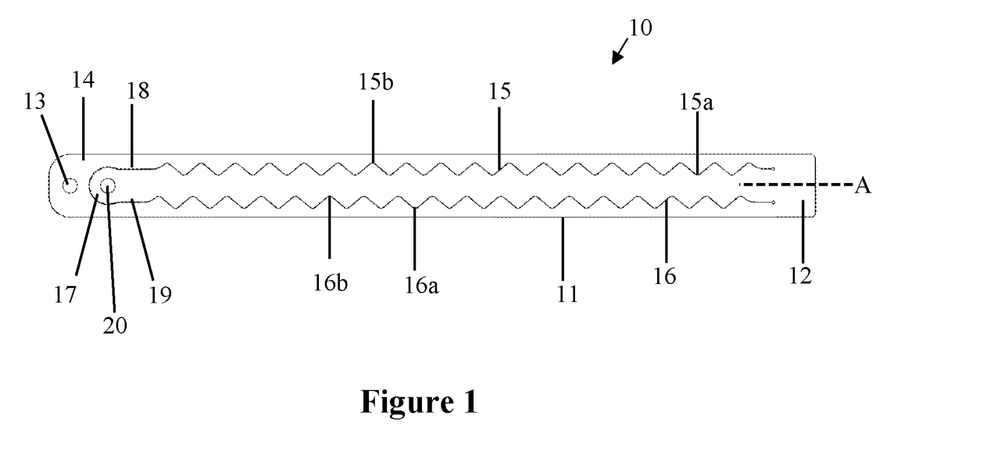
FIG. 1 is a plan view of an energy absorber according to some non-limiting embodiments or aspects of the present disclosure in an undeployed configuration.

FIG. 1 shows an energy absorber 10 according to some non-limiting embodiments or aspects of the present disclosure in an undeployed configuration. The energy absorber 10 includes an elongate member 11 having a distal end 12 and a proximal end 14. In this non-limiting embodiment or aspect, the elongate member 11 is a metallic strip.

The proximal end 14 of the elongate member 11 includes an aperture 13 for receiving a connector, such a karabiner or shackle, therethrough.

In some non-limiting embodiments or aspects, a first line of weakness 15 and a second line of weakness 16 extend along a portion of the elongate member 11 in the longitudinal direction (A) between the proximal end 14 and the distal end 12 of the elongate member 11. In some non-limiting embodiments or aspects, only a single line of weakness may be provided.

In some non-limiting embodiments or aspects, the first line of weakness 15 is spaced from the second line of weakness 16 in the transverse direction of the elongate member 11.

In this non-limiting embodiment or aspect, the first and second lines of weakness 15, 16 are grooves (or continuous lines of weakness). It will be appreciated that, in some non-limiting embodiments or aspects, the first and/or second line of weakness 15, 16 may comprise perforations, rather than a groove.

In some non-limiting embodiments or aspects, the first and second grooves 15, 16 are formed by laser etching the elongate member 11, rather than scoring. Laser etching does not add any additional stress to the elongate member 11, unlike scoring or perforating the elongate member 11. In addition, laser etching generally allows the grooves 15, 16 to be manufactured more accurately.

In some non-limiting embodiments or aspects, the first groove 15 is of substantially the same length as the second groove 16. There is a gap (or space) between the distal edge of the elongate member 11 and the first and second grooves 15, 16.

In some non-limiting embodiments or aspects, the grooves 15, 16 are connected to a tab 17 disposed at the proximal end 14 of the elongate member 11. The tab 17 is separated from the body of the elongate member 11 by a U or C shaped cut. The tab 17 has a first edge 18 connected to the proximal end of the first groove 15 and a second end 19 connected to the proximal end of the second groove 16.

In some non-limiting embodiments or aspects, the tab 17 and the first 15 and second 16 lines of weakness separate (or delineate) a first portion 21 of the elongate member 11 from a second portion of the elongate member 11. The first portion 21 may be referred to as a tear strip.

In some non-limiting embodiments or aspects, the first 15 and second 16 grooves each include a straight (or linear) section where the grooves are connected to the first edge 18 and second edge 19 respectively of the tab 17. An issue with known energy absorbers comprising linear grooves is that the initial force required to start tearing along the groove (and therefore to start absorbing energy) is higher than the force required to tear along the remainder of the groove. The use of the initial straight sections of the grooves 15, 16 eliminates the peak in force required to initiate deployment, as along the straight section there is a reduced tearing distance for a given length compared to the remaining non-linear portion of the groove.

In some non-limiting embodiments or aspects, the straight sections of the grooves 15, 16 preferably have the same depth as the remainder of the groove 15, 16.

The tab 17 includes an aperture 20 for receiving a connector therethrough. In use, the aperture 13 in the elongate member 11 is connected to an anchor point or a fall arrest device. The aperture 20 in the tab 17 is connected to the user (such as to a user's harness).

As shown in FIG. 1, the first and second grooves 15, 16 do not follow an entirely straight path. Rather, the first and second grooves 15, 16 follow a substantially non-linear path, such as a wave or a zigzag. This is advantageous as a wave or zigzagged path means that the grooves 15, 16 follow a longer path on the same length of elongate member 11. Thus, an elongate member 11 of a given length can absorb more energy from a fall arrest event than if the grooves 15, 16 were straight (or linear). Thus, a thinner elongate member 11 can be used compared to the prior art, which is more cost effective and convenient for the user as the energy absorber is lighter and less bulky.

Figure 2:
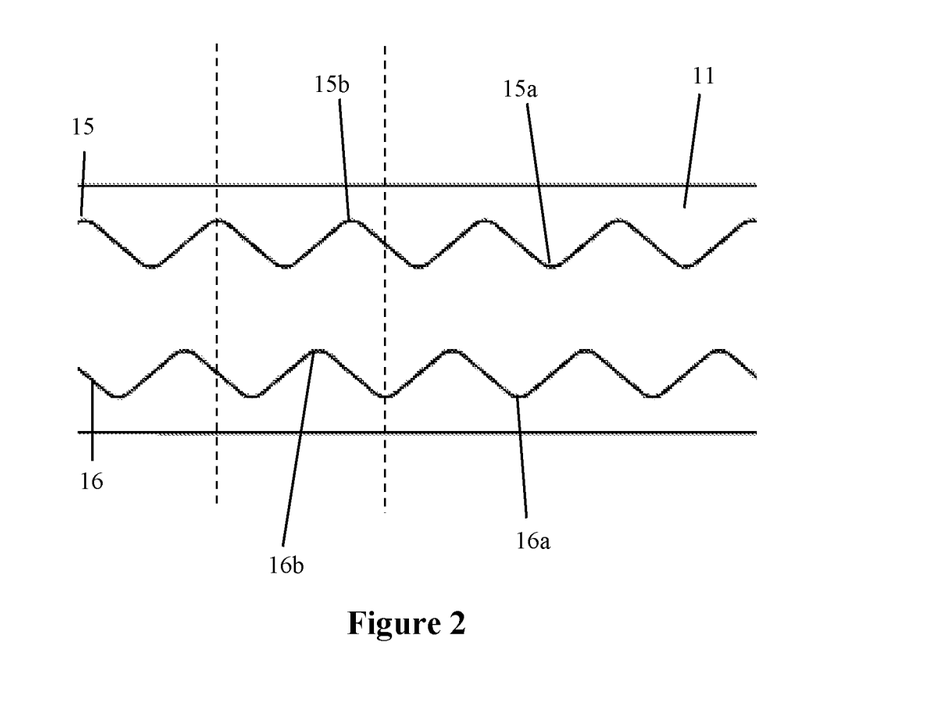
FIG. 2 is a close up of a portion of the energy absorber in FIG. 1.

The grooves are shown in more detail in FIG. 2, which is a close-up of a portion of FIG. 1.

As shown in FIG. 2, the first groove 15 is offset (or not aligned with) the second groove 16. The first groove 15 includes a plurality of peaks 15b and a plurality of troughs 15a. These could equivalently be referred to as the turning points of the groove. Similarly, the second groove 16 comprises a plurality of peaks 16b and a plurality of troughs 16a.

In some non-limiting embodiments or aspects, the peaks 15b of the first groove 15 are not aligned with the peaks 16b or the troughs 16a of the second groove 16. This is shown more clearly by the dotted lines in FIG. 2. In this example, the first groove 15 is approximately 90 degrees out of phase with the second groove 16. It is advantageous for the first groove 15 to be offset (or shifted) relative to the second groove 16 as this avoids high load spikes when the grooves change direction.

If the first groove 15 was completely out of phase (180 degrees) with the second groove 16 then the troughs 15a would be aligned with (i.e. positioned directly above or opposite) the peaks 16b of the second groove. Thus, at these points the spacing between the grooves 15, 16 would be reduced, creating a weak point which could potentially tear or break.

It will be appreciated that the phase difference between the first and second grooves 15, 16 is not limited to 90 degrees.

Figure 3:
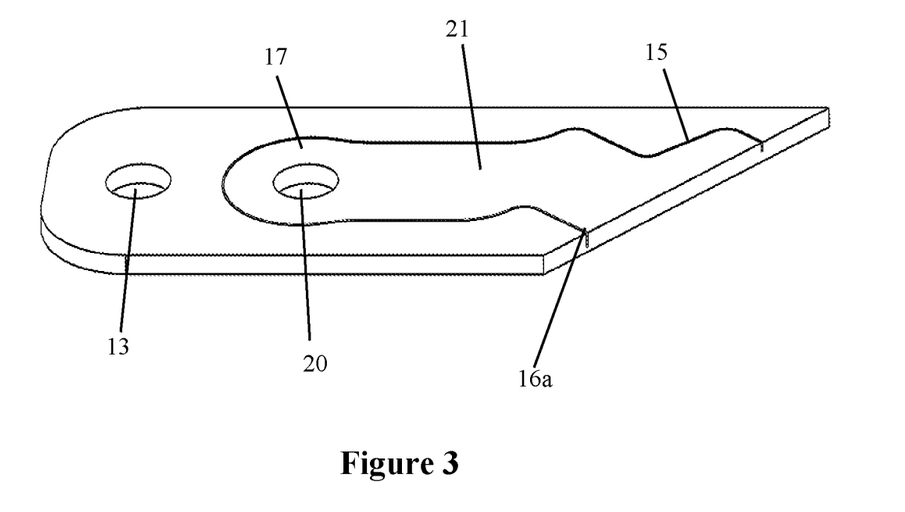
FIG. 3 shows a cross-section taken at an angle through a section of the energy absorber in FIG. 1.

In some non-limiting embodiments or aspects, the depth of the first and/or second groove (or line of weakness) 15, 16 may vary along the length of the groove. As shown in FIG. 3, the first and/or second groove may be deeper at the peaks 15b, 16b and troughs 15a, 16a of the grooves. The depth of the groove is defined as the distance that the groove extends into the body of the elongate member 11. In other words, the first groove 15 and/or the second groove 16 may be shallower along the straight (or linear) portions of the groove compared to the turning points of the groove. This may be advantageous as it may increase the smoothness of the tearing of the elongate member in a fall arrest event. If the groove 15, 16 is of a uniform depth along its length then, particularly if the turning points are quite abrupt (or narrow), it may be difficult for the energy absorber to tear along (or around) the turning point of the groove. Increasing the depth of the groove(s) at the turning points reduces the force required to tear along that portion of the groove, thereby decreasing the risk of an incomplete deployment of the energy absorber.

Figure 4:
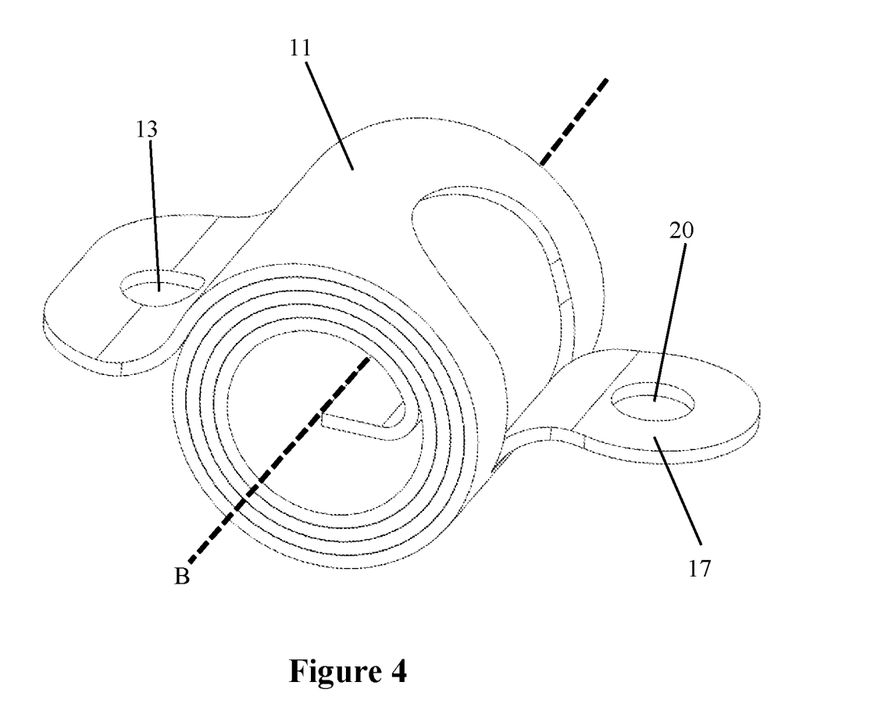
FIG. 4 is a perspective view of the energy absorber of FIG. 1 in a coiled configuration prior to deployment.

As shown in FIG. 4, the energy absorber 10 can be coiled prior to use. In the coiled configuration the length of the elongate member 11 is rolled or coiled such that the axis B through the centre of the coil is parallel to the transverse axis of the elongate member 11.

In some non-limiting embodiments or aspects, the aperture 13 in the proximal end 14 of the elongate member 11 extends from the coil to be connected to an anchor point spaced from the user. The end of the tab 17 is separated from the body of the elongate member 11 such that the aperture 20 can be connected to the user. In use, if the user falls (i.e. a fall arrest event occurs) the aperture 13 will remain fixed to the anchor point and the tab 17 will be pulled away from the aperture 13 in the direction of the user's descent. This will cause the elongate member 11 to uncoil and to tear along the first and second grooves 15, 16 to at least partially absorb the energy of the user's fall.

Figure 5:
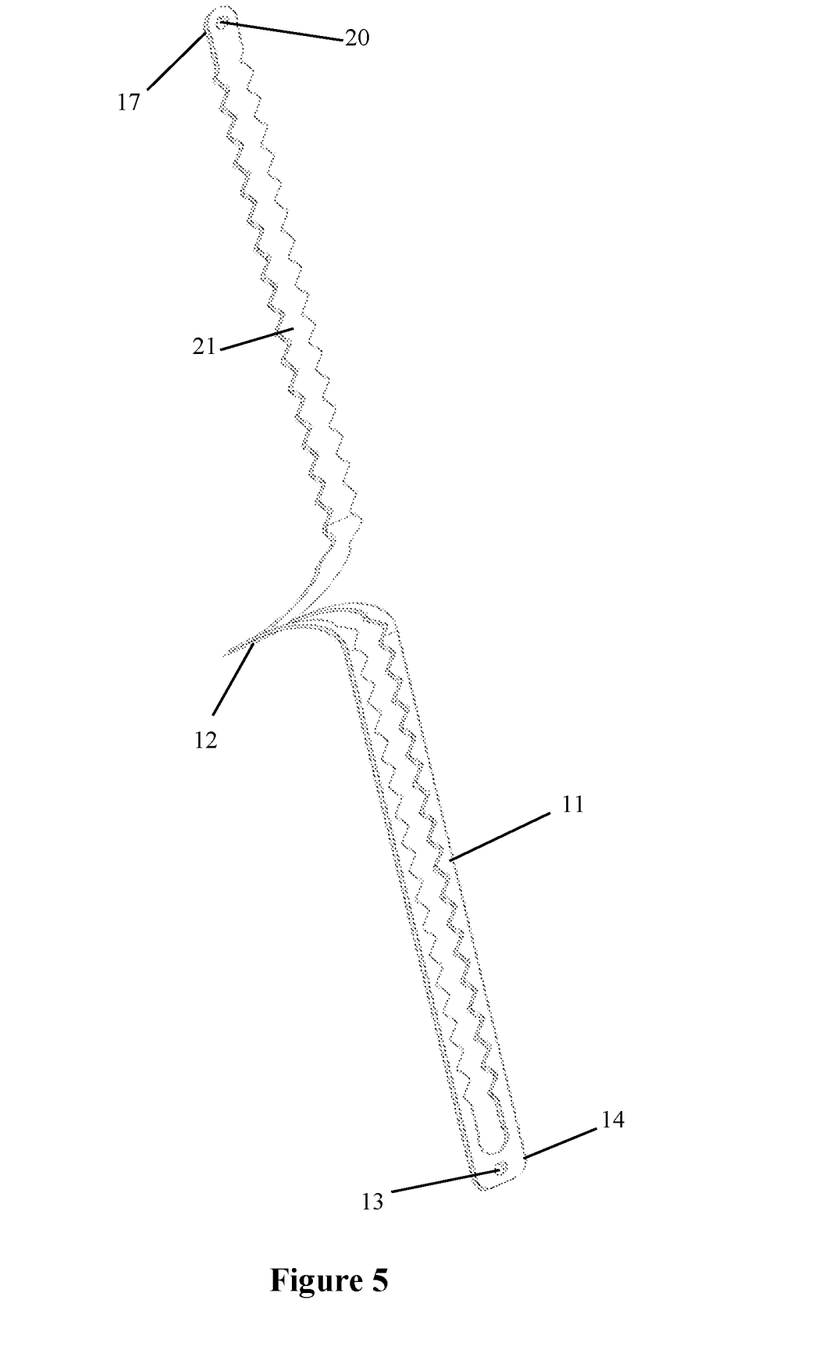
FIG. 5 is a perspective view of the energy absorber of FIGS. 1 to 4 in a fully deployed configuration.

FIG. 5 shows the energy absorber 10 in a fully deployed configuration after a fall arrest event. The elongate member 11 has uncoiled. The force of the tab 17 pulling away from the aperture 13 has torn the elongate member 11 along the first groove 15 and the second groove 16. As such, the tear portion 21 is only connected to the body of the elongate member 11 at the distal end 12. The elongate member 11 and/or the tear portion 21 may also stretch or deform when moving from the undeployed configuration, as long as the tear portion 21 does not become fully detached from the elongate member 11.

The non-limiting embodiments or aspects of the present disclosure have been described in detail herein. However, it will be appreciated by those skilled in the art that various modifications and alternatives to the embodiments or aspects may be made without departing from the concepts disclosed in the foregoing description. Such modifications are to be considered as included within the following claims unless the claims, by their language, expressly state otherwise. Accordingly, the particular embodiments or aspects described in detail hereinabove are illustrative only and are not limiting as to the scope of the disclosure, which is to be given the full breadth of the appended claims and any and all equivalents thereof.

The invention claimed is:

1. An energy absorber for use in a fall arrest system, the energy absorber comprising:
   an elongate member comprising a proximal end and a distal end; and
   at least one line of weakness extending in a longitudinal direction in a non-linear manner along at least a portion of the elongate member between the proximal end and the distal end,
      wherein the non-linear manner of the at least one line of weakness comprises two or more repeating turning points such that the at least one line of weakness is not entirely a straight path from the proximal end to the distal end, and
      wherein, in response to an application of a predetermined force, the elongate member is configured to tear along the at least one line of weakness.

2. The energy absorber according to claim 1, wherein the at least one line of weakness is a groove.

3. The energy absorber according to claim 1, wherein the at least one line of weakness is at least one of the following:
   partially wavy,
   zig-zagged,
   serriform, and
   any combination thereof.

4. The energy absorber according to claim 1, wherein the at least one line of weakness is formed by laser etching.

5. The energy absorber according to claim 1, wherein the at least one line of weakness comprises a first line of weakness and a second line of weakness, wherein the first line of weakness is transversely spaced from the second line of weakness.

6. The energy absorber according to claim 5, wherein the first line of weakness is offset or misaligned from the second line of weakness.

7. The energy absorber according to claim 5, wherein the first line of weakness and the second line of weakness each have a plurality of turning points, wherein the plurality of turning points of the first line of weakness are offset or misaligned from the plurality of turning points of the second line of weakness.

8. The energy absorber according to claim 7, wherein the first line of weakness and the second line of weakness each have a plurality of peaks and a plurality of troughs, wherein at least one of the plurality of peaks and the plurality of troughs of the first line of weakness are offset or misaligned from at least one of the plurality of peaks and the plurality of troughs of the second line of weakness.

9. The energy absorber according to claim 8, wherein at least one of the plurality of turning points, the plurality of peaks, and the plurality of troughs of the first line weakness and the second line of weakness are rounded.

10. The energy absorber according to claim 8, wherein one of the first line of weakness and the second line of weakness is deeper at the plurality of turning points, the plurality of peaks, or the plurality of troughs compared to the other of the first line of weakness and the second line of weakness.

11. The energy absorber according to claim 1, further comprising a tab divided from the elongate member by a cut, wherein the at least one line of weakness extends from the tab towards the distal end of the elongate member.

12. The energy absorber according to claim 11, wherein the tab comprises a first edge and a second edge, and wherein the at least one line of weakness comprises a first line of weakness extending from the first edge of the tab and a second line of weakness extending from the second edge of the tab.

13. The energy absorber according to claim 12, wherein the first line of weakness and the second line of weakness each comprise a linear portion, wherein the linear portion of the first line of weakness and the second line of weakness is connected to the first edge of the tab and the second edge of the tab, respectively.

14. The energy absorber according to claim 13, wherein each linear portion has a same depth as a depth of remaining portion of the first line of weakness and the second line of weakness.

15. The energy absorber according to claim 11, wherein the proximal end of the elongate member comprises a first aperture configured for receiving a first connector connected to an anchor point, and wherein the tab comprises a second aperture configured for receiving a second connector connected to a user.

16. The energy absorber according to claim 1, wherein the at least one line of weakness is spaced from at least one of the distal end and the proximal end of the elongate member.

17. The energy absorber according to claim 1, wherein the elongate member is a metallic strip.

18. The energy absorber according to claim 1, wherein the elongate member is provided in a coiled configuration and, in response to the application of the predetermined force, the elongate member is configured to deploy to an uncoiled configuration.

19. The energy absorber according to claim 1, wherein the at least one line of weakness is a continuous line of reduced thickness of the elongate member, or wherein the at least one line of weakness comprises a plurality of perforations.

20. The energy absorber according to claim 1, wherein a depth of the at least one line of weakness varies along the length of the at least one line of weakness.

* * * * *